Patented Mar. 7, 1939

2,149,458

UNITED STATES PATENT OFFICE 2,149,458

RUBBER DERIVATIVE COMPOSITION

Eugene W. Moffett, Chicago, Ill., assignor to Marbon Corporation, a corporation of Delaware No Drawing. Application January 23, 1936, Serial No. 60,452

5 Claims. (Cl. 106—23)

This invention relates to new compositions of matter comprising halogen containing rubber derivatives and oximes. The invention includes manufactured products such as coated objects and sheets or films.

The halogen containing rubber derivatives such as rubber chlorides and rubber hydrochlorides have found considerable utility in thin film form, either as coatings or as self supporting films suitable for wrapping and other purposes. It is preferable that such films should remain colorless and flexible over extended periods of time.

However, the sunlight or other light rich in ultra violet rays causes these films to eventually become brittle and to discolor. Even when not exposed to sunlight the films after long periods of time show increase in brittleness and discoloration. It appears that the change which takes place in the halogen containing rubber derivative such as rubber hydrochlorides is some form of deterioration, the mechanism of which is not definitely known.

Many attempts have been made to retard the aging of the films. Retardation of the change has been effected by the addition of various substances. Terpenes such as pinene have definitely improved the age resistance of films of rubber hydrochloride; likewise substituted dimethyl amines such as hexamethylene tetramine have been found of value. Practically all these materials, however, have certain disadvantages such as odor, incompatibility with the rubber hydrochloride or are not as effective as might be desired.

I have found that the oximes and particularly the aliphatic polyoximes of high molecular weight will readily mix with halogen containing rubber derivatives, and effectively retard the detrimental changes due to aging, such as for example the increase in brittleness of the rubber hydrochloride films when aged in the presence of sunlight over extended periods of time.

The oximes may be readily prepared from ketones and aldehydes by the use of hydroxyl amine hydrochloride according to the well known methods of organic synthesis. Camphoroxime, for example, may be prepared by dissolving 10 parts by weight of camphor in 150 parts by weight of ethyl alcohol and adding thereto 10 parts of hydroxyl amine hydrochloride and 15 parts of sodium hydroxide, all dissolved in 60 parts by volume of water. The mixture is refluxed for three hours and filtered. The solid camphoroxime is washed with water, dissolved in petroleum ether, dried and cooled.

The following table shows the effect of various oximes in retarding the brittleness of films of approximately .003" thickness, made of substantially saturated rubber hydrochloride. The tests were run in the regulation fadeometer commonly used for aging tests. The films were made by incorporating the oximes in a rubber hydrochloride solution, casting the solution on a base, evaporating the solvent and stripping the resulting clear, transparent film from the base.

Table

| Compound | Percent | Color | Compat | Brittle at end of— | First color noted |
|---|---|---|---|---|---|
| | | | | Hours | Hours |
| Blank | | | | 42 | O. K. |
| Heptaldoxime | 3 | O. K. | O. K. | 52 | 52 |
| Camphor oxime | 3 | O. K. | O. K. | 52 | 52 |
| Cyclohexanone oxime | 3 | O. K. | O. K. | 82 | 82 |
| Octaldoxime | 4 | O. K. | O. K. | 94 | 52 |
| Methylethyl ketoxime | 4 | O. K. | O. K. | 94 | 82 |
| Benzaldoxime | 4 | O. K. | O. K. | 82 | 29 |
| Methyl isopropyl ket. | 4 | O. K. | O. K. | 67 | 82 |
| n-Butyraldoxime | 4 | O. K. | O. K. | 71 | 82 |
| n-Propyl ketoxime | 4 | O. K. | O. K. | 67 | 82 |
| Dimethylglyoxime | 3 | O. K. | O. K. | 150 | 48 |

The above table shows that the oximes are of value as age resistors and that the dioximes are much better than the monoximes. Furthermore the aliphatic oximes are preferable to the aromatic oximes from the point of view of color. The high boiling and high molecular weight oximes are also preferred to the volatile oximes because of the odor of the volatile oximes and the loss due to evaporation.

The oximes, including the solid oximes, are readily compatible with rubber hydrochloride, and act as plasticizers in addition to their action as age retarders. Unlike many of the other age resistors known to the art, the oximes, and in particular the long chain oximes may be mixed with rubber hydrochloride in 10 parts by weight or more per 100 parts of rubber hydrochloride without danger of blooming. Thus considerable plasticizing effect as well as age inhibiting effect can be obtained without detriment to the clarity of the film.

It is believed that the oximes or compounds of the type

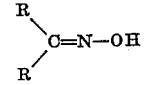

where R is an alkyl, aryl, hydrogen or halogen, all have the effect of retarding the aging of halogen containing rubber derivatives. The following additional oximes, for example, are operable:

Methyl decahydronaphthyl ketoxime
Acetonylacetodiketoxime
Acetyl aceto diketoxime
Caro oxime
Dihydrocinnamalacetoxime
Dicinnamalacetoxime
Dimethyl cyclohexane dioxime
Laurketoxime It has been found that the age resistors mentioned herein have an age inhibiting effect on rubber derivatives of varying chlorine content. The invention is, therefore, not limited to the use of such compounds with substantially saturated rubber hydrochlorides or rubber chlorides but includes the use of such compounds with partially saturated halogen containing rubber derivatives. The preferred use, however, is in thin flexible sheets of rubber hydrochloride such as can be used for wrapping purposes.

I claim:

1. A composition of matter essentially comprising a halogen containing rubber derivative and having incorporated therein an oxime of the general formula

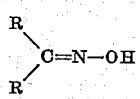

in which R is an alkyl, aryl, hydrogen or halogen.

2. A composition of matter essentially comprising a rubber hydrochloride and having incorporated therein an oxime of the general formula

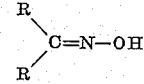

in which R is an alkyl, aryl, hydrogen or halogen.

3. A composition of matter essentially comprising a rubber hydrochloride and having incorporated therein a minor proportion of methylethyl ketoxime.

4. A composition of matter essentially comprising a rubber hydrochloride and having incorporated therein a minor proportion of dimethylglyoxime.

5. A composition of matter essentially comprising rubber hydrochloride and having incorporated therein a minor proportion of heptaldoxime.

EUGENE W. MOFFETT.